United States Patent [19]
Ciccone et al.

[11] Patent Number: 5,225,915
[45] Date of Patent: Jul. 6, 1993

[54] IMAGE PROCESSING WITH NOISE ENHANCING OPERATORS FOR MOIRE REDUCTION AND/OR RANDOM DOT GENERATION

[75] Inventors: Theresa J. Ciccone; Ranjit Bhaskar, both of Rochester, N.Y.

[73] Assignee: Xerox Corporation, Stamford, Conn.

[21] Appl. No.: 364,396

[22] Filed: Jun. 9, 1989

[51] Int. Cl.$^5$ ............................................. H04N 1/40
[52] U.S. Cl. .................................... 358/454; 358/447; 358/448; 382/54
[58] Field of Search ............... 358/447, 448, 454, 455, 358/456, 457, 458, 465, 466, 75, 80; 382/54

[56] References Cited

U.S. PATENT DOCUMENTS

| | | | |
|---|---|---|---|
| 4,049,958 | 9/1977 | Hartmann | 235/193 |
| 4,449,150 | 5/1984 | Kato | 358/283 |
| 4,578,714 | 3/1986 | Sugiura et al. | 358/283 |
| 4,691,343 | 9/1987 | Tenenbaum | 379/100 |
| 4,691,366 | 9/1987 | Fenster et al. | 382/54 |
| 4,700,235 | 10/1987 | Gall | 358/283 |
| 4,739,413 | 4/1988 | Meyer | 358/281 |
| 4,748,514 | 5/1988 | Bell | 358/288 |
| 4,755,813 | 7/1988 | Williams | 340/799 |
| 4,782,399 | 11/1988 | Sato | 358/280 |
| 4,811,108 | 3/1989 | Numakura et al. | 358/298 |
| 4,811,115 | 3/1989 | Lin et al. | 358/283 |
| 4,817,180 | 3/1989 | Cho et al. | 382/54 |
| 4,818,543 | 4/1989 | Petilli | 358/454 |
| 4,819,066 | 4/1989 | Miyagi | 355/14 E |
| 4,821,109 | 4/1989 | Roe | 358/253 |
| 4,876,610 | 10/1989 | Ohsawa et al. | 358/443 |
| 4,926,251 | 5/1990 | Sekizawa et al. | 358/75 |

FOREIGN PATENT DOCUMENTS 56-141667 4/1980 Japan .
56-143766 4/1980 Japan .

OTHER PUBLICATIONS

Digital Image Processing, Gonzalez & Wintz, Addison-Wesley Publishing Co., Reading, Mass., 1977, pp. 58 and 212.
"A Survey of Electronic Techniques for Pictorial Reproduction", Stoffel et al., IEEE Transactions on Communications; vol. COM-29; No. 12; Dec. 1981.

Primary Examiner—Edward L. Coles, Sr.
Assistant Examiner—Thomas D. Lee
Attorney, Agent, or Firm—Mark Costello

[57] ABSTRACT

In an image processing device for processing image data representing an image, and including an image filtering arrangement, a filter function is applied to the image data that greatly amplifies or enhances high frequency imge data, including noise inherent in the image. Such noise, which may be the granularity of the image, when enhanced, serves to mask the beating pattern of moiré. One function which accomplishes adequate high frequency and noise filtering is a modified Laplacian function with a maximum modulation at a frequency of the noise or granularity of the image. Similarly, the special effect of a random screen image or mezzo tint is obtained when a continuous tone image is processed with the modified Laplacian filtering function, and subsequently thresholded in a thresholding arrangement.

6 Claims, 3 Drawing Sheets

IMAGE PROCESSING WITH NOISE ENHANCING OPERATORS FOR MOIRE REDUCTION AND/OR RANDOM DOT GENERATION

The present invention relates generally to the use of digital filtering and thresholding techniques in electronic image reproduction, and more particularly, to image filtering methods to obtain special effects using certain noise enhancing operators.

INCORPORATION BY REFERENCE

U.S. Pat. No. 4,755,813 to Williams, U.S. Pat. No. 4,748,514 to Bell, and U.S. Pat. No. 4,049,958 to Hartmann are incorporated by reference herein.

BACKGROUND OF THE INVENTION

When electronic image data is acquired from an electronic input scanner, it is initially in an analog form. The sensing system of the raster input scanner detects the amount of light reflected from the scanned original and for a discrete area viewed, assigns the sensed light a representative analog value ranging over a continuous scale of values. Upon acquiring this data, the analog information is transformed into a digital approximation of the value, which in many applications may be represented, for example, by an 8 bit data byte, which has a resolution 256 levels of intensity. Since the data derived is indicative of various intensity levels, it must be converted into a format suitable for printing on an output device or display on a soft display device. For example, in a binary printing device, a two level output is required, while other devices allowing printing of more than two levels will require corresponding greater numbers of output levels. Generally, the 8 bit data of varying intensity is directed through a threshold device to determine whether the data for a selected location should be assigned a spot or a blank. The data value for any given pixel location is compared to a threshold value to determine whether a spot should be printed for that location, or if the location should be left blank. In simple applications, particularly for line graphics or text, a single threshold value may be applied to all the data derived by the scanner. Tonal range, contrast and other qualities of the output image may be varied by controlling the threshold conversion applied to the image.

When reproducing continuous tone graphics, such as photographs or paintings, it is often desirable to reproduce the original image grey. To print grey, the printer is directed to modulate the number of spots or intensity of spots within an area, rather than placing all spots or all blanks in the area. The result is perceived as grey. In a binary printer the density of grey is controlled by placing fewer or greater numbers of spots within the same unit of area. Selection of which pixels will appear as either spots or blanks is chosen on the basis of a digital halftone screen or dither matrix. This method has long been used to depict photographic (or continuous tone) inputs. What is accomplished is a synthetically produced grey in order to create a pleasing image. Accurate reproduction or life-like rendition may not always be of interest. Image processing with screening methods can result in images with special effects. These special effects are sometimes desired for eye catching or "artistic" effects. Typically, a screen with predetermined patterns or random dots or lines is used.

Other image processing arrangements offer the opportunity to vary an image and control its ultimate reproduction. Filters work by changing the grey value of each pixel in the electronic image based on various mathematical relationships to one or more pixels in the immediate surrounding area. Filters vary in their function by the relationship employed, by the size of the area covered by the filter and the number of pixels used, and/or coefficient values associated with each pixel. Filters work by emphasizing edges or particular frequencies of interest. Just as there are screens that create special effects in images, there are also filters that create their own type of special effects. Differential filters detect edges in an image, resulting in the output image being an 'outlined' version of the original. There are many differential filters useful for edge gradient detection, including one class known as Laplacian operators. Such filters are discussed in Gonzalez & Wintz, *Digital Image Processing*, Addison-Wesley Publishing Co. Reading, MA p. 58 and p. 212.

Moiré is the result of two or more periodic patterns beating or interacting with each other. Patterns here are defined as halftone screens or sampling (i.e., digitizing). Sampling moiré is unavoidable. It varies with sampling frequency of the image input device and the input image frequency. It is an artifact of sampling a periodic input. It is common practice to apply screens in making images of pictorial documents, such as photographs or art work, to create the appearance of intermediate levels of grey.

Several methods have been used in the past to mask or minimize moiré. A very common way of masking moiré is to apply a low pass filter to demodulate high frequencies, before thresholding or rescreening the image. Low pass filters can be used to limit moiré because they suppress high frequencies. The drawback with this method is that the sharpness of the resultant image is correspondingly reduced as well. An alternative to this technique uses hardware or software to apply noise (e.g., with random number generator applying random numbers to a screening operation) to the scanned image, as shown for example in U.S. Pat. No. 4,700,235 to Gall, U.S. Pat. No. 4,449,150 to Kato, U.S. Pat. No. 4,578,714 to Sugiura et al., JP-A 56-143766 to Yokomizo and JP-A 56-141667 to Yokomizo. The artificially produced noise breaks up, or masks the structure of the moiré patterns eliminating some of the high frequency structure that comprises the moiré. The disadvantage of this method is that it can be intolerably slow for software applications and expensive in hardware.

U.S. Pat. No. 4,782,399 to Sato uses filtering of a digital image to eliminate moiré effects by processing the image along two channels, a high resolution channel and a low resolution channel, and selecting the channel that produces the best result for particular image data types. U.S. Pat. No. 4,821,109 to Roe describes the use of a probability function which introduces a random element in the choice of elemental areas at the edge of a halftone dot, U.S. Pat. No. 4,819,066 to Miyagi pertains to continuous tone image data processing that attempts to approximate continuous tone images by reproducing the exact density of the original image. U.S. Pat. No. 4,691,343 to Tenenbaum shows a facsimile arrangement which uses an audio carrier signal superimposed on the image information signal to eliminate noise. U.S. Pat. No. 4,691,366 to Fenster et al. teaches image enhancement by filters selected to attenuate noise. U.S. Pat. No. 4,739,413 to Meyer teaches defining pixel density by a value having amplitude and phase. U.S. Pat. No. 4,811,108 to Numakura et al. teaches conversion of a continuous tone image to a halftone image by processing the data so that the density of a control point in the continuous tone image and the density of a corresponding control point in the halftone image are correlated. U.S. Pat. No. 4,811,115 to Lin et al. teaches the use of an approximate auto correlation function to detect the frequency of halftone image data to select the method of handling the data. U.S. Pat. No. 4,817,180 to Cho et al. teaches the filtering in one or two dimensions for detail emphasis. References herein cited are all specifically incorporated by reference for their teachings.

SUMMARY OF THE INVENTION

In accordance with the invention, there is provided a method of image processing for producing with a filter operator, for selected enhancements to an image, the effect of random noise by the application of selected functions alone or in combination with other thresholding or image processing techniques.

In accordance with one aspect of the invention, in an image processing device for processing image data representing an image, and including a filtering function, a filter function is applied to the image data that greatly enhances high frequency image data, including noise inherent in the image. Such noise, which may be the granularity of the image, serves to mask the beating pattern of moiré, when present. One function which accomplishes adequate high frequency noise enhancement is a modified Laplacian function. Subsequently, the image is thresholded to place it in an appropriate form for printing.

In accordance with another aspect of the invention, the special effect of a random screen image or mezzo tint is obtained when a continuous tone image is processed with a modified Laplacian filter function, and subsequently threshold. The result allows the image data to be processed in a manner allowing the effect of a random screen without the use of a screen, preparatory to printing.

The modified Laplacian operator referred to in conjunction with the described invention is a filter function characterized by a n×m operator, where n and m are greater than or equal to 3, with a uniform, or nearly uniform field of negative coefficients about a single positive coefficient, and the sum of all the coefficients of the operator is greater than 0. By nearly uniform, it is understood that some variation among the negative coefficients may be acceptable, and still obtain the effect of the invention. Additionally, the single positive coefficient need not necessarily be centrally located in the field.

The Laplacian filter, which greatly amplifies high frequencies, may be used to minimize moiré. It enhances high frequency noise, which masks the moiré. Lower frequencies characterized by moiré are not enhanced as greatly. The amount of masking is dependent upon system and input image noise. The noise impairs the periodic pattern of moiré, visually masking that defect. Intermediate grey levels are maintained by modification to the filter which tends to preserve some of the D.C. characteristics of the system. The video is then threshold to give a more random appearance to the reproduced dot pattern.

For already halftoned original documents, this process may replace both a low pass filter and subsequent screening process normally applied to high frequency halftone originals to prevent moiré. It also replaces the use of a random noise generator in conjunction with screening software or hardware for masking moiré.

The theory behind the random halftone generation technique as applied to photographs or continuous tone images derives from work by Siedentopf in the 1930's. He showed that the effective granularity of a photograph is a direct function of the distribution of the photographic grains, or $$G = (\text{Log}_{10} e) \times (a_{av}) \times D$$

Where
G = Granularity;
$a_{av}$ = Average Grain size;
D = Density.

Siedentopf thus showed that that the random noise occurring at any point on a photographic image is proportional to the density at that point.

The inventive image processing apparatus and method described here takes advantage of the idea that the photograph or other continuous tone images themselves can be the source of an infinite random number generator, and the magnitude of the random number is correlated with density. The appearance emulates the effect of a random halftone process and extends to any document where the inherent noise (or granularity) in the process is proportional to the darkness (or density) at each point. In addition, since the method uses thresholding and not halftoning, the implementation of the method is simpler.

The random screening effect emulated by the modified Laplacian function as applied to a continuous tone image, in combination with a standard thresholding process is, in itself, useful for a variety of purposes. Because of the random dot pattern, obtained from the amplification of random noise in the image, subsequent reproduction of the image with a periodic sampling process will not be susceptible to moiré. A pleasing artistic or visual effect may be obtained. The darkness of the image is adjustable by merely altering the threshold level and/or the DC of the noise enhancing operator. This arrangement constitutes another method of converting a grey image into a format suitable for printing in a binary printer. A cost advantage may be available if an image processing arrangement provided with a programmable filter does not require a random screening function.

These and other aspects of the invention will become apparent from the following description used to illustrate a preferred embodiment of the invention read in conjunction with the accompanying drawings in which:

FIG. 1 demonstrates a block diagram of an image processing device wherein the present invention finds use;

Digital image information in the form of image data picture elements, (hereinafter, pixels), digital voltage representations of image intensity at discrete locations in an image, is provided from a suitable source. For example, the image data pixels may be obtained through line by line scanning of an image bearing original by one or more photosensitive imaging devices, such as a multiple element array of charge coupled devices, commonly referred to as CCD's. Line by line scanning of an image bearing original for the derivation of image information is well known and does not form a part of the present invention. Of course, it will no doubt be appreciated that image information may be computer generated, or provided from an electronically stored original. While the present invention finds particular utility with an image scanning device, and will be described with reference thereto, the invention may also find relevant use in a loop back mode, or with a processing system which may or may not include a scanner. As used herein, the term "screen" or "screening function" will refer to a process of applying thresholds to data, whether those thresholds are distributed over a range of values over an area, as commonly understood to constitute a screen process, whether the screen applies a single threshold, commonly understood as a threshold process, or whether a mathematical or statistical process is used to apply a threshold or screen to data as in error diffusion methods. A variety of image processing techniques used to reproduce continuous tone or halftone pictorial input are known, as demonstrated for example in "A Survey of Electronic Techniques for Pictorial Reproduction, by J.C. Stoffel and J.F. Moreland, originally published at *IEEE Transactions on Communications*, Vol. COM-29, No. 12, Dec. 1981, pp. 1898-1925.

Figure 1:
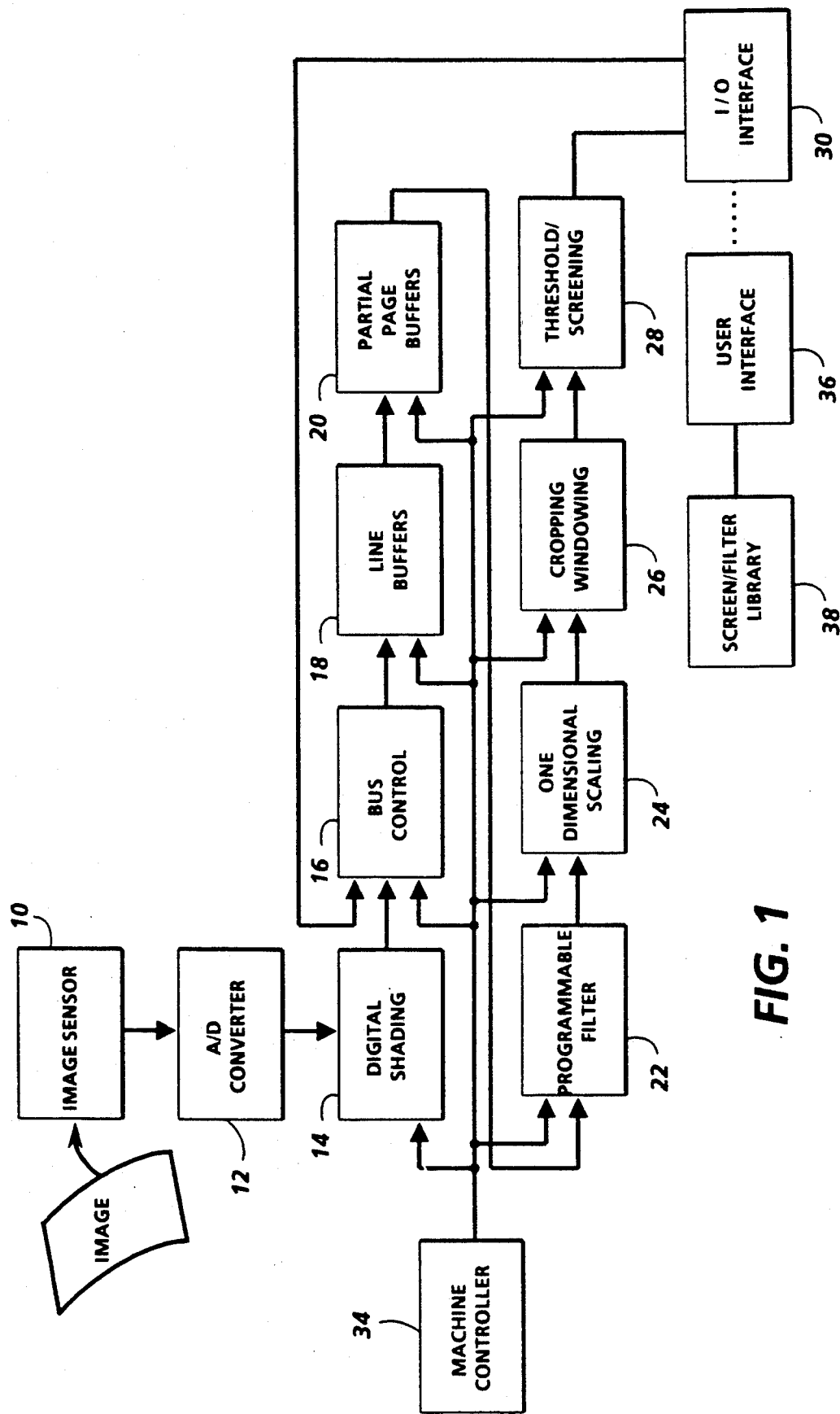

With reference now to the drawings, where the showings are for the purpose of illustrating a preferred embodiment of the invention and not for limiting same, FIG. 1 shows an image processing arrangement such as that exemplified by the Xerox 7650 Pro Imager, in an application which may be used in association with the present invention. In the described embodiment, image information or image data may be initially derived from an imaging device, typically comprising a scanning array of photosensitive elements, which generate analog signals in accordance with exposure to light imagewise reflected from an original document. When image information is produced from a scanning device, it might be produced along several channels, where each channel represents a portion of the scanning array from which image information is derived. Providing plural channels will allow parallel and faster processing of the image information. In a high density scanning array, which may have a length corresponding to the full width of a document to be scanned, several channels may be present; but, for the purpose of explaining the present invention, only a single channel will be illustrated. As used herein, "fast scan direction" refers to the direction across the image, typically, although not necessarily, parallel to the array of photosensitive elements while the "slow scan direction" refers to the direction perpendicular to the fast scan direction, and parallel to relative movement between an image and the array.

Each channel directs image information from the image sensor 10 to an analog to digital converter 12, functionally adjacent to the scanning array, to be converted from the analog signal initially derived from the image sensor to a digital grey level signal, typically an 8 bit data byte, into digital shading circuit 14. At digital shading circuit 14, data is normalized against a predetermined calibration to account for discrepancies in the sensitivity of each photosensitive element. The data is also deskewed to account for the order in which data is derived from each photosensitive element in the scanning array, and correction algorithms account for bad photosensitive element locations in the array by various interpolation and bad pixel discarding routines. Bus control 16 controls the entry of data to the image processing portion of the device from either the scanning electronics or from an outside source. Line buffers 18 operate in a ping pong buffer arrangement to convert the data flow from synchronous operation at the scanner electronics to asynchronous operation at the image processing section. Data stored in a first buffer is read out of the first buffer while a second buffer is filled, with reading and storage occurring independently, in accordance with operating requirements. Partial page buffer 20 is a FIFO memory device that stores data over a portion of a page at a time, and depending upon its status as full or empty, the speed of the scanning operation is controlled. Of course, it will be appreciated that while the data line is illustrated as a single line, the 8 bit data byte may transmitted from device to device along 8 parallel data transmission lines, or serially.

Figure 2:
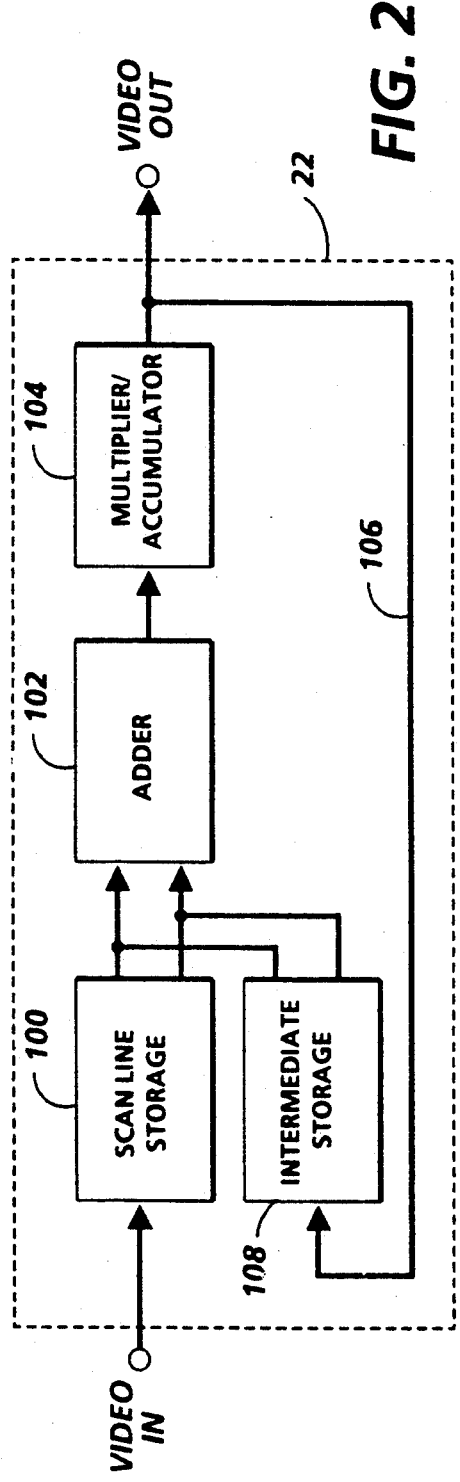
FIG. 2 is a block diagram illustrating a filter of an image processing device as in FIG. 1.

Each of serveral processing function circuits, including filter 22, one dimensional scaling circuit 24, cropping and windowing circuit 26, and thresholding and screening circuits 28, are enabled by controller 34 for operation on image data. Any of the processing functions may be accomplished by a hardwired arrangement, or by a microprocessor operating in accordance with an appropriate instruction set. Controller 34 may be a microprocessor driven device, responsive to operator commands through a user interface 36, which may be a computer connected via output interface 30, with software appropriate to drive the image processing device, and selection of functions, to cause controller logic to enable image processing function circuits 22, 24, 26, and 28. Pixel clock and pixel line synch signals are directed through controller 34 for control of the various image processing operations at appropriate points in the stream of data. Device memory, in this case illustrated as screen and filter library 38, is accessible through user interface 36 to control the operation of the various functions in accordance with predetermined routines. The memory may be accessible to the user interface 36 for the addition or access of information. Of course the described arrangement is but one possible scanning and image processing arrangement, where many arrangements are known and useful in relation to the present invention With reference to FIG. 2, programmable filter 22 is a digital filter typically including scan line storage device 100, adder 102, multiplier/accumulator 104, and a feed back loop 106 from the output of multiplier/accumulator 104 through intermediate storage device 108 to the input of adder 102, provides the following one dimensional filter function definable in each of the fast and slow scan directions, for a filter having a field of N:

$$y(n) = \sum_{m=0}^{N-1} h(m) \times x(n - m)$$

where
x(n) is the input to the filter;
y(n) is the output of the filter;
h(m) is the sample response of the filter.

While a one dimensional filter is described in conjunction with the invention and the Xerox 7650 Pro Imager, two dimensional filters are available.

Figure 2A:
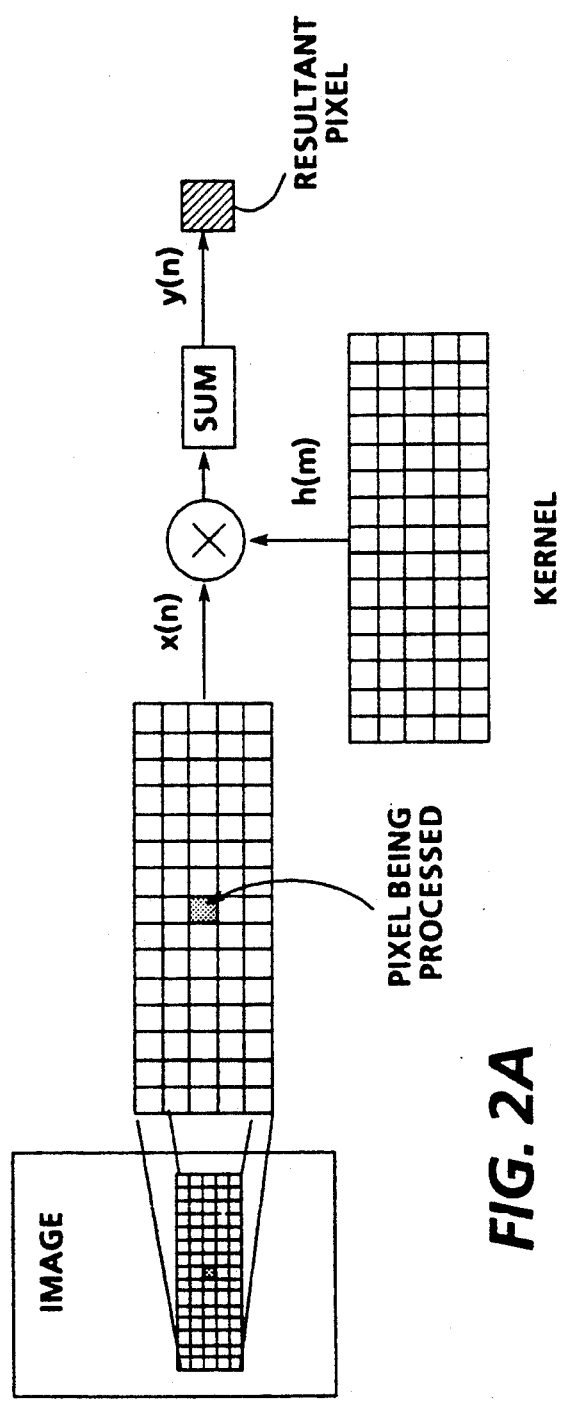
FIG. 2A illustrates the filter process with respect to programmed coefficients.

While common filter functions include noise filters and enhancement filters, and other filters for correcting the image data resulting from previously applied image processing techniques it has been determined that by the application of special filter functions to the image, special effects may be obtained by the filter. In the Xerox 7650 Pro Imager filter, an m×n (fast scan×slow scan) array of multipliers or coefficients may be applied to the image about a particular pixel (in the case of the Xerox 7650 Pro Imager, the maximum array size is 15×15). FIG. 2A represents the filter function operation. Coefficient values are applied to the filter to form the "kernel", which will form the multiplier value for the function. In the Xerox 7650 Pro Imager, coefficients determined to identify the desired filter function are multiplied by a factor of 128 in the slow scan direction and 32 in the fast scan direction, and the whole number result is used to load the kernel, so that digital values are used by the multiplier. To actually load the filter, and because of the symmetrical nature of the filter, a twelve value data file is loaded with the first eight values of the data file representing the coefficients along the fast scan axis, the ninth being the multiplier for center pixel adjust, and the last three values representing the coefficients for the slow scan axis. The center point for the fast scan axis corresponds to the first data point, and the slow scan axis center is the twelfth data point. For the 7650, the convolution kernel must be represented in the software in a separable filter format.

Figure 3:
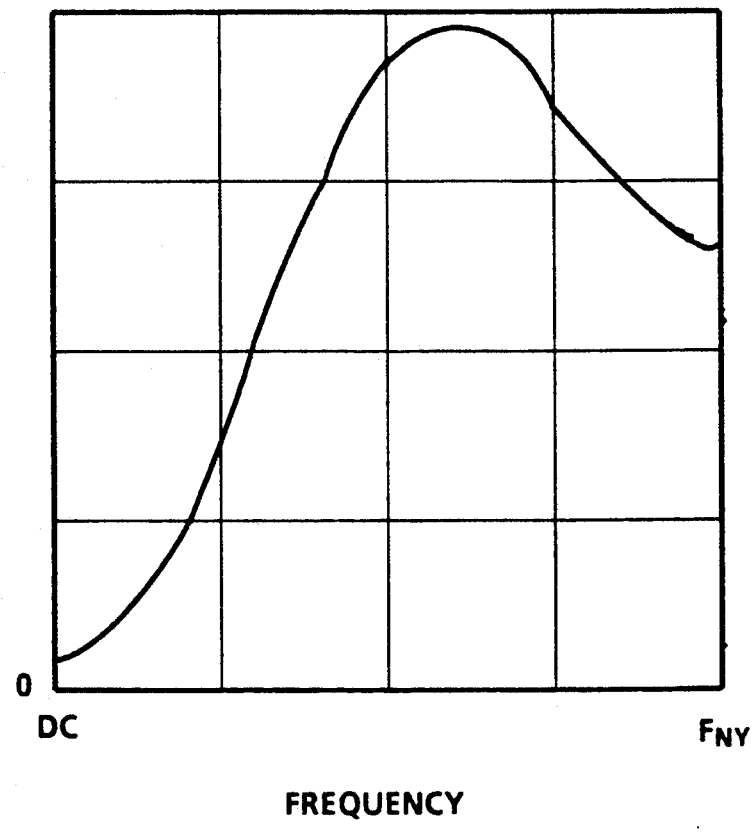
FIG. 3 shows the modulation transfer function of the operator described with respect to the invention.

In accordance with the invention and as shown in FIG. 3, the modified Laplacian function shown, given over a range of frequency values from DC to the Nyquist frequency ($F_{NY}$), which is one half sampling resolution, may be applied to an image to obtain certain unusual effects. The magnitude of the maximum value R and the frequency at which it occurs is, selected based on interacting effects of the visual process, the sampling frequency, the noise generated from a specific image, and visual appeal. Particularly, the modified Laplacian function shown, tends to greatly amplify high frequency elements of the image, including noise inherent at such high frequency values. The maximum value of the function is selected based on the interacting effects of the visual process including the sampling frequency, the noise generated for a specific image and visual appeal. If the input image is an already screened image, scanner sampling or a second rescreening of the video may produce the beat patterns characteristic of moiré. However, the modified Laplacian function of FIG. 3, provides a masking of the beat patterns, breaking up the characteristic moiré pattern, while maintaining intermediate grey levels. The function shown greatly enhances the noise (granularity) of the image to provide masking. Thus, the addition of random noise generated from a source exterior to the image is unnecessary, as is the usual low pass filtering used for moiré removal which tends to give the appearance of reduced sharpness. It will no doubt be appreciated that the function is applied in both fast and slow scan directions in accordance with fast scan and slow scan coefficients.

The Laplacian operator referred to with respect to FIG. 3 is a filter function characterized by a m×n operator, where n and m are greater than or equal to 3, with a uniform, or nearly uniform field of negative coefficients about a single positive coefficient, and the sum of all the coefficients of the operator is greater than 0. By nearly uniform, it is understood that some variation among the negative coefficients may be acceptable, and still obtain the effect of the invention. Additionally, the single positive coefficient need not necessarily be centrally located in the field.

Tables 1 and 2 below respectively show a generic m×n filter coefficient operator and an example m×n filter coefficient operator in accordance with the invention.

TABLE 1

| $A_{1,1}$ | $A_{1,2}$ | ... | $A_{1,j}$ | ... | $A_{1,m}$ |
|---|---|---|---|---|---|
| $A_{2,1}$ | $A_{2,2}$ | ... | $A_2$ | ... | $A_{2,m}$ |
| ... | ... | ... | ... | ... | ... |
| $A_{i,1}$ | $A_{i,2}$ | ... | $B_{i,j}$ | ... | $A_{i,m}$ |
| ... | ... | ... | ... | ... | ... |
| $A_{n,1}$ | $A_{n,2}$ | ... | $A_n$ | ... | $A_{n,m}$ |

Table 1 shows a modified Laplacian operator, where $$(((m \times n) - 1) \times A) + B > 0$$

and $$A < 0$$

otherwise given as $$B = (m \times n \times A) + \epsilon$$

where
B is the single positive coefficient of the operator;
A is the value of the negative coefficient of the operator;
m×n gives the size, in pixels, of the field of the operator; and
$\epsilon$ is the difference, between B and m×n×A.

With the above, derivation of the example filter coefficient operator of Table 2 can be seen. The value of $\epsilon$ is variable and effects the darkness of the images by varying the dynamic range of the operator.

TABLE 2

| −0.1904 | −0.1904 | −0.1904 | −0.1904 | −0.1904 |
|---|---|---|---|---|
| −0.1904 | −0.1904 | −0.1904 | −0.1904 | −0.1904 |
| −0.1904 | −0.1904 | 2.7252 | −0.1904 | −0.1904 |
| −0.1904 | −0.1904 | −0.1904 | −0.1904 | −0.1904 |
| −0.1904 | −0.1904 | −0.1904 | −0.1904 | −0.1904 |

It will no doubt be appreciated that among images, noise may be predominant at differing frequencies. Accordingly, the function may be shifted along the frequency domain to accommodate those differing frequency values.

Subsequent to filtering, a straight threshold value is applied to the filtered image. Further screening is not required.

If a photographic or continuous tone image is filtered as described, and subsequently a threshold value is applied to the image, a random screen effect or mezzo tint is created. This effect gives the appearance of a randomly screened image, without requiring the use of a random number generated screen. Thus, without use of a random screening function, the image is placed in condition for printing at a binary printer. The level at which the image is thresholded serves to darken or lighten the image.

The modified Laplacian filter itself may be viewed as the combination of two simple filters, a negative low pass filter and a signal amplifying filter. The low pass filter tends to blur subtle shades of contrast together, while the second emphasizes maxima and minima. The combination of the two serves to create a filter that enhances high frequency features, such as edges and random noise, while suppressing low frequencies. The thresholding application enhances the effect by eliminating differences between shades of contrast, or low frequencies.

While implementation of the invention has been described with respect to a self-contained scanning operation, an image processed in accordance with the invention may be derived from another source, and stored on a memory device for use as in a loop back mode or software operation. Additionally, nothing in principle bars the use of a hardwired filter, or selection of hardwired filters from being used in accordance with the invention.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. A method of processing digital image data to alter the appearance thereof, including the steps:
   (a) supplying image data, said image data including inherent random noise, and having an original periodic function, said image data having superimposed thereon an additional periodic function, said original and additional periodic functions having frequencies creating a moiré pattern in said image data;
   (b) applying a filter function to the image data supplied, said filter function having the characteristics of enhancing high frequency and noise of said image data, whereby enhancement of said random noise masks the moiré pattern in said image data.

2. The image processing method defined in claim 1 wherein the filter function applied is a modified Laplacian function, having a maxima at a frequency optimizing noise enhancement.

3. An arrangement for processing digital image data to alter the appearance thereof, including:
   means for supplying image data, said image data including inherent random noise, and having an original periodic function, said means for supplying image data, superimposing on said image data an additional periodic function, said original and additional periodic functions having frequencies creating a moiré pattern in said image data;
   means for applying a filter function to the image data supplied, said filter function having the characteristics of enhancing high frequency and noise of said image data, whereby, enhancement of said random noise masks the moiré pattern in said image data.

4. The image processing arrangement defined in claim 3 wherein the filter function applied is a modified Laplacian function, having a maxima at a frequency optimizing noise enhancement.

5. An arrangement for processing digital image data to alter the appearance thereof with a simulated random screen effect, including:
   means for supplying image data, said image data including inherent random noise;
   means for applying a filter function to the image data supplied, said filter function having the characteristics of enhancing high frequency elements and noise of said image data; and
   means for applying a threshold level to said image data.

6. The image processing arrangement defined in claim 5 wherein the filter function applied is a modified Laplacian function, having a maxima at a frequency optimizing noise enhancement.

* * * * *